UNITED STATES PATENT OFFICE.

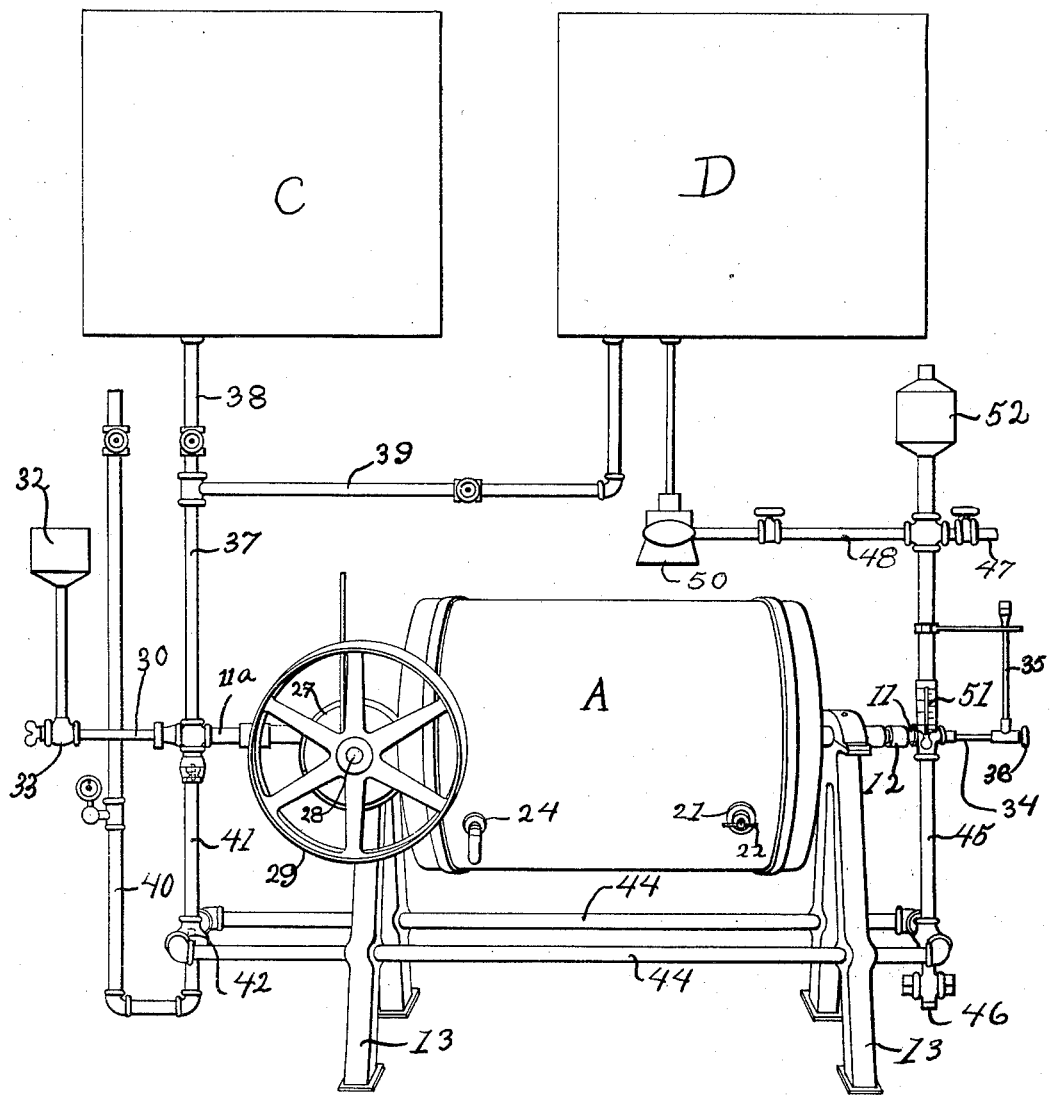

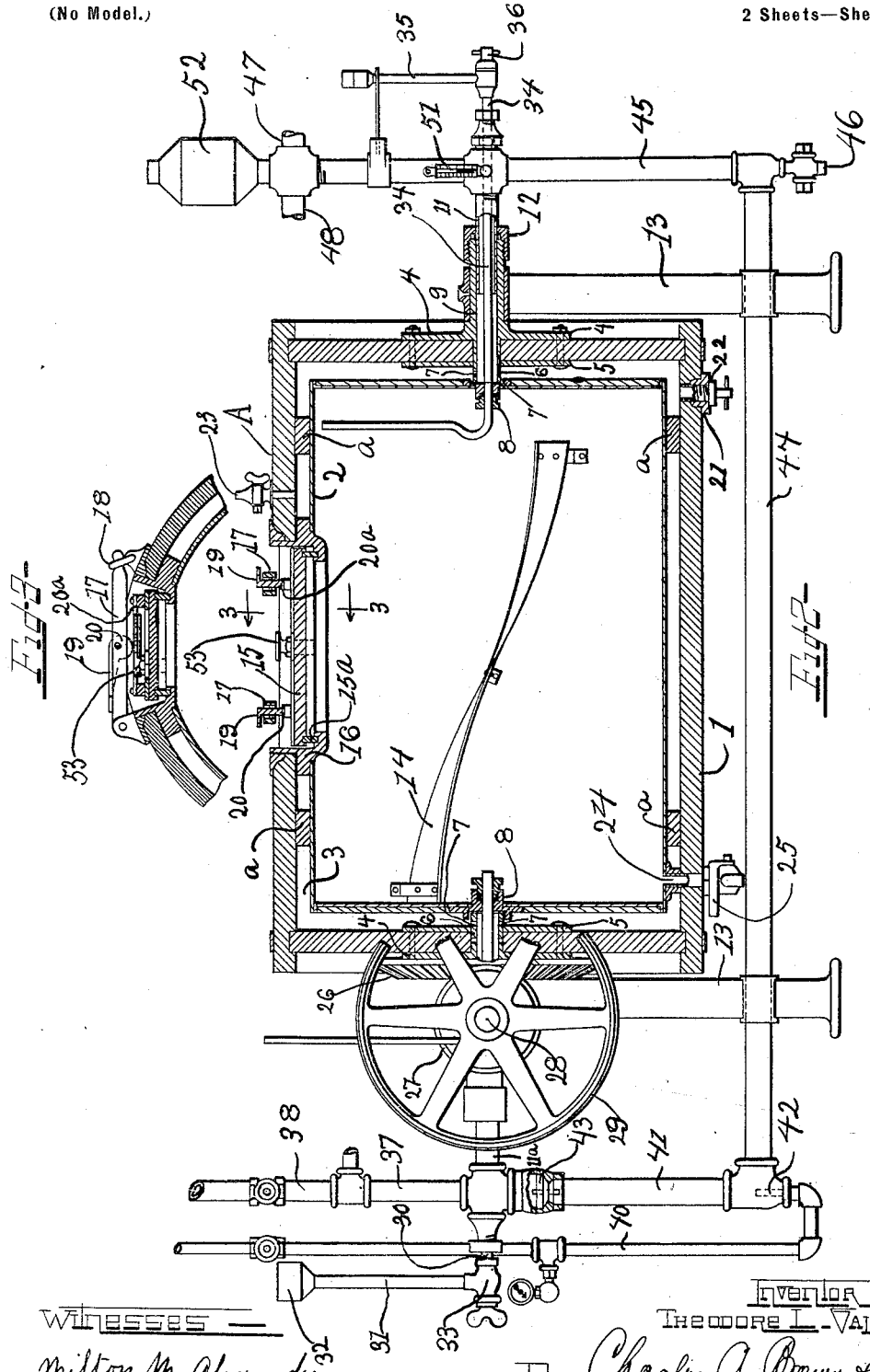

THEODORE L. VALERIUS, OF FORT ATKINSON, WISCONSIN, ASSIGNOR TO THE CREAMERY PACKAGE MANUFACTURING COMPANY, OF CHICAGO, ILLINOIS, A CORPORATION OF ILLINOIS.

PASTEURIZING APPARATUS.

SPECIFICATION forming part of Letters Patent No. 701,109, dated May 27, 1902.

Application filed December 29, 1900. Serial No. 41,479. (No model.)

*To all whom it may concern:*

Be it known that I, THEODORE L. VALERIUS, a citizen of the United States, residing at Fort Atkinson, in the county of Jefferson and State of Wisconsin, have invented a certain new and useful Improvement in Pasteurizing Apparatus, (Case No. 1,) of which the following is a full, clear, concise, and exact description, reference being had to the accompanying drawings, forming a part of this specification.

My invention relates to apparatus which can be employed either to pasteurize or sterilize milk or to ripen cream, all of these operations involving the raising of the temperature of the liquid to a suitable point, retaining it there for a predetermined length of time, and then reducing it to a predermined low point. The invention relates in particular to apparatus of this kind in which provision is made for agitation of the liquid under treatment while the temperature thereof is being varied to accomplish the pasteurizing, sterilizing, or ripening operation.

The principal objects of the invention are to provide a simple and thoroughly practical apparatus by which the above-mentioned operations can be carried on and to arrange for the economical and efficient variation of the temperature of the liquids under treatment.

In the accompanying drawings, Figure 1 is a view, partly in perspective and partly in diagram, of a pasteurizing apparatus containing my invention. Fig. 2 is a view, partly in section and partly in vertical elevation, of a portion of such apparatus; and Fig. 3 is a cross-sectional view of a part of the apparatus shown in Fig. 2 on line 3 3 of Fig. 2.

The apparatus which is illustrated in the drawings comprises the pasteurizer, sterilizer, or ripener proper, A, in which these various operations take place, suitable sources for supplying fluid for varying the temperature of the liquid to be treated, and connections by which these temperature-varying fluids can be admitted to and withdrawn from the pasteurizer or ripener.

In accordance with my invention the pasteurizer or ripener proper, A, comprises a rotary structure, consisting of an outer cylindric casing 1 and an inner cylindric casing 2, which latter is arranged within the casing 1 and secured rigidly thereto, so as to rotate therewith. The casing 2 is arranged within the casing 1 in such a way as to afford a space 3 between itself and the outer casing 1. The inner casing 2 is to receive the fluid which is to be treated, and the space 3 is to receive the fluids for varying the temperature of the contents of the inner casing 2 in accordance with the well-known principles of pasteurization, sterilization, and ripening, the space 3 being, in effect, a chamber for the temperature-varying fluids. The outer casing 1 is desirably composed of wood and the inner casing 2 desirably made of metal. The casing 2 is held in proper position within the casing 1 by blocks $a$ $a$. The opposite ends of the outer casing 1 are each provided on the outside with a plate 4 and on the inside with a plate 5, which plates are bolted together through the ends of the casing. The plate 4 has an inwardly-extending tubular portion 6, which extends through the end of the casing 1, to which the plate is secured, and through the plate 5 on the inside of such end and also to the end of the inner casing 2. This tubular portion 6 is provided with apertures 7 7, opening into the space 3. At the end of the tubular portion 6 is a stuffing-box 8, which makes a tight connection between the tubular portion 6 and the end of the casing 2. Each plate 4 is also provided with an outwardly-projecting tubular portion 9, which extends horizontally outward and forms a journal, the tubular portions 6 and 9 having the same bore, and thus forming a passage communicating with the space between the two casings. The outer ends of the tubular structures 9 9 receive the ends of the pipes 11 and 11ª, with which connections can be made. A stuffing-box 12 is arranged at the end of the tubular portion 9, so as to form a tight connection between the same and the pipes 11 and 11ª.

The rotary structure A is supported by suitable standards 13 13, arranged at its opposite ends and having at their upper ends bearings adapted to receive the tubular portions 9 9 at the opposite ends of the rotary structure A. By such arrangement it will be seen that provision is made for proper support and rotation of the rotary structure A by journals formed by the cylindrical tubular portions 9 9. It will also be seen that provision is made for proper centering of the inner casing 2 by the tubular portions 6 6, extending through the ends of the outer casing 1 and connected with the ends of the inner casing 2. It will also be seen that a couple of passages are provided, each arranged to communicate with the space between the two casings, one at each end of such space, and that these passages are both absolutely tight and free from the possibility of becoming clogged, each one being formed by a single tubular structure provided at its opposite ends with stuffing-boxes, which allow its rotation relatively to the parts immediately associated with its opposite ends. The passage 10 at the left-hand end of the structure (referring to Fig. 2 of the drawings) is desirably employed for outlet purposes, as will hereinafter be set forth.

The inner casing 2 is desirably provided with an interiorly-arranged dasher 14, which acts to produce a rotation of the contents of the casing when the casing revolves.

The rotary structure A is provided with a door or cover 15, which is arranged to seat upon a suitable frame 16, fitted into an aperture in the outer casing 1 and extended inwardly, so as to fit also into an aperture in the inner casing 2. The frame 16, therefore, provides an opening into the inner casing 2 from outside of the outer casing 1, there being no communication with the interior of the outer casing 1, and the door 15 serves to open and close this opening into the inner casing. This opening is, of course, for the purpose of filling the inner casing 2 with the liquid to be treated when the machine is not in rotation. The door 15 is desirably provided with rubber or cork packing 15ª to make a tighter joint with the frame 16. The door or cover 15 is held tightly closed when it is seated by a couple of levers 17 17, each of which is pivoted to the rear side of the frame 16 and has its forward end adapted to be engaged by a link or coupling 18, pivoted to the front side of the frame 16. Each of the levers 17 17 carries a cam-lever 19, pivoted near its middle and having its pivoted end provided with a cam 20, which is adapted to act downwardly upon the door when the lever 19 is swung downwardly, as shown in Fig. 3. The cams 20 20 act upon flat springs 20ª 20ª, extended across the door or cover and secured thereto by their opposite ends. This affords an absolutely tight and a permanent closure of the opening into the chamber for the liquid to be treated, and at the same time presents no obstacle to the free rotation of the device and resists its own tendency to become disconnected during rotation. It will be seen that the frame 16 comprises a substantially rectangular frame tapering or converging inwardly and having a seat at its lower or inner end upon which the door can rest and also having outwardly-projecting flanges which fit in between the inner and outer casings and so serve to hold the frame and the adjacent ends of the inner and outer casings securely and tightly in their proper relative positions.

The outer casing 1 is provided with an outlet 21, having a plug 22, by which outlet 21 the casing can be drained, as desired. The casing 1 is also provided with an air-cock 23, by which the air can be vented from the chamber for the temperature-varying fluids as such chamber is filled by those fluids. The inner casing 2 is provided with an outlet 24, controlled by a valve-handle 25, by which outlet 24 the liquid under treatment can be drained when the casings are at rest.

As an arrangement for driving the rotary structure containing the liquid under treatment and the temperature-varying fluids the casing 1 is provided with a beveled gear 26, which meshes with a beveled pinion 27, carried by a shaft 28, mounted and arranged at right angles to the axis of the rotary cylindric structure A. The shaft 28 carries a belt-pulley 29, by which the shaft can be driven by a suitable belt.

An inlet-pipe 30 for the liquid under treatment is extended through the pipe 11ª, the associated tubular portions 9 and 6, and stuffing-box 8, so that the inner end of the pipe communicates with the interior of the inner casing 2, this pipe having a tight joint at its inner end by reason of the stuffing-box 8. The outer end of the pipe 30 is provided with an upwardly-extending pipe 31, having a funnel 32 for the liquid to be treated at its upper end. At the junction of the pipes 30 and 31 is arranged a valve 33, by which the flow of liquid through the pipe 30 can be controlled. A pipe 34 is extended through the pipe 11 and the associated passage 10 into the inner casing 2, whence it extends upwardly to nearly the top portion of the cylindric wall of said casing, this pipe 34 being for an air-vent for venting the air from the interior of the casing 2 when such casing is filled with the liquid to be treated. Like the pipe 30 at the other end of the device the pipe 34 has a tight connection with the casing 2 by means of the stuffing-box 8, whereby leakage from the passage 10 into the casing 2 is prevented. The outer end of the pipe 34 connects with an upwardly-extending pipe 35, through which the air can escape. The joint between the pipes 34 and 35 is provided with a valve 36 to control the outflow of air in said pipes.

My invention further contemplates an improved arrangement for supplying temperature-varying fluids to the chamber of the rotary structure provided for such fluids. It also contemplates an improved arrangement by which the flow of these fluids can be controlled in an efficient and advantageous manner.

In accordance with the invention I desirably provide a couple of sources of cooling fluid C and D, the former of which is to contain and supply cooling-water at substantially the normal atmospheric temperature and the latter of which is to contain and supply cooling fluid at a very low temperature—such, for example, as ice-water or brine. These sources of supply of cooling fluids under different temperatures are connected with a supply-pipe 37 by valve-pipes 38 and 39, the pipe 37 being connected with the pipe 11$^a$ at the outer end thereof. I also provide a steam-pipe 40, which conveniently extends downwardly alongside of the supply-pipe 37 and is connected with a connecting-pipe 41, which extends upwardly and connects with the pipes 11$^a$ and 37 at the junction thereof. The pipe 41 is provided with a steam-jet 42, pointing upwardly in said pipe, and is also provided with a check-valve 43, adapted to allow the upward passage of fluid in the pipe 41, but to prevent the downward passage of the same therein. I also provide in accordance with my invention a circulating system, which in the construction shown embraces a couple of pipes 44 44, arranged horizontally below the rotary structure A and conveniently supported on legs of the standards 13 13. The circulating-pipes 44 44 meet one another at their opposite ends and are connected at one end with the pipe 41 at the point in the latter where the steam-jet 42 is arranged and at the other end with a vertically-arranged pipe 45, which extends upwardly alongside of the apparatus and connects with the outlet-pipe 11. These pipes 44 44 are provided with a drain-pipe 46, conveniently connected with them at their junction with the pipe 45. The vertically-disposed pipe 45 is provided with valved branch pipes 47 and 48, the former of which serves as an overflow-pipe and is led to any suitable point where the overflow of waste water can be disposed of and the latter of which is connected with the source D for the supply of ice-water or brine or other low-temperatured fluid, so as to serve as a return for such fluid. The pipe 48 includes a pump 50, by which a return circulation of the brine or ice-water can be induced. The pipe 45 is provided with a thermometer 51, by which the temperature of the temperature-varying fluid is indicated. The top of the pipe 45 is provided with an expansion-tank 52, by which the expansion of the temperature-varying fluids can be taken care of. The cover 15 is provided with a thermometer 53, by which the temperature of the contents of the receptacle is indicated.

In the operation of the apparatus the fluid to be treated is introduced within the interior casing or receptacle 2, this being done in the first instance by pouring it in through the large opening in the cylindrical portion of the structure, after which the cover or door is secured tightly in place. The outer casing 1, or rather the portion of the chamber provided by this casing unfilled by the interior casing 2, is then filled with liquid under ordinary temperature, as by passing it thereinto from the source of fluid-supply C by way of the pipes 38, 37, and 11$^a$, the valves of these various pipes being properly opened for this purpose. As the space 3 of this outer casing 1 becomes filled the air contained by it passes out of the vent 23, which is properly opened for this purpose. When the space is filled, the circulating-pipes 44, 44, 41, and 45 and the inlet and outlet pipes 11 11$^a$ and connections also become filled. Power is then applied to the device, so as to rotate the shaft 28, and thereby cause the rotation of the rotary structure A. Steam is next turned on in the pipe 40, and the steam-jet 42 operates so as to force the water in the pipe 41 upward and also to heat the same. By the upward movement of the water in the pipe 41 a circulation is induced through the chamber provided by the outer casing and also through the inlet and outlet pipes 11$^a$ and 11, respectively, the circulating-pipes 44 44, and the connecting-pipes 41 and 45. By heating the water in the pipe 41 the fluid in the outer casing and the circulating system, consisting of the pipes mentioned, is rapidly heated, and this heat operates to raise the temperature of the contents of the inner casing or receptacle 2. As the water or heating fluid is heated it of course expands and the steam introduced through the steam-jet 42 further adds to its volume. This excess fluid escapes through the overflow-pipe 47. When the heating fluid is heated to such an extent as to bring the contents of the receptacle 2 to nearly the proper temperature, steam is shut off in the pipe 40, the temperature of the heating fluid gradually rising to the proper temperature after the steam is shut off. The apparatus is then allowed to run for the proper length of time, the contents of the casing or receptacle 2 being all this time subjected to the action of the heat and being agitated by the rotation of the rotary structure A and the action of the dasher or breaker 14 within the inner casing. The liquid to be treated having been retained a sufficient length of time at a moderately high temperature, cooling fluid from the source of supply C is again introduced into the casing 1 in the same way as before. This fluid gradually commingles with the fluid already contained by the casing 1 and the circulating system and so gradually reduces the temperature of the fluid in the outer casing, and thereby the temperature of the liquid in the receptacle or inner casing 2. During this time the circulation still continues through the casing 1 and the circulating system in the manner previously described—that is to say, upwardly in the pipe 41, from left to right in the pipe 11$^a$, the casing 1, and the pipe 11, downwardly in the pipe 45, and from right to left in the pipes 44 44—this circulation being induced in the present instance—that is, when the steam-jet 42 is not in operation—by the inflow of the cooling fluid through the inlet-pipe 11ª. During this second inflow of the cooling fluid from the tank or source of supply C for cooling purposes the excess fluid overflows in a similar manner through the overflow-pipe 47. If it is desired to cool the liquid being treated lower than the temperature of the fluid in the tank C, the cooling fluid from the tank D is used, when the temperature of the liquid under treatment falls to substantially the temperature of the fluid in the source of supply C. To permit this, the fluid already in the outer casing 1 and in the circulating system is first drawn off through the drains 46 and 21, it being in some cases necessary to stop the apparatus in order to permit the withdrawal of the fluid from the casing 1 through the drain 21. Fluid is then introduced into the casing 1 from the tank D by way of the pipes 39, 37, and 11ª and is supplied to the apparatus continually until the temperature of the liquid under treatment is reduced to the desired point. A circulation of this fluid is induced through the outer casing 1 and circulating system by the flow of the fluid into the pipe 11ª in the way in which the circulation is induced during the second flow of the fluid from the tank C, as above described. If brine is contained in the tank D, it is desirable to save the same and return it again to this tank. This return flow of the brine to the source of supply F is induced by the pump 50.

Instead of filling the interior receptacle through the large opening closed by the cover 15 or in adding to the liquid introduced into the receptacle by means of this opening the liquid to be treated can be introduced by way of the inlet-tubes 30 and 31. In this way liquid can be introduced into the receptacle for it while the apparatus is in rotation.

It will be observed that the apparatus above set forth possesses many advantages. Among these may be mentioned the following: The construction which permits the rotation of the rotary cylinder is simple, practical, and inexpensive. It allows the introduction and withdrawal of the liquid and temperature-varying fluids during the rotation of the cylinders. The air-vent 34 in addition to allowing the escape of the air as the receptacle is filled permits the free expansion and contraction of the contents of the receptacle without subjecting the apparatus to any strain tending to compress or collapse it. The arrangement for holding the cover down is thoroughly practical and reliable and insures an absolutely tight joint for the cover, and the presence of the spring upon which the cam acts insures an equal distribution of the pressure to which the cover is subjected. The spiral breaker within the liquid-receptacle insures the rotation of the contents of the receptacle from end to end thereof, and thereby permits a thoroughly even cooling and heating of said contents. The arrangement of the sources of supply for the temperature-varying fluids allows an effective and rapid heating and cooling action with a minimum inconvenience or labor. The connections by which the temperature-varying fluids are introduced into and withdrawn from the apparatus permit substantially any temperature variation desired to be brought about. The presence of the steam-jet in these connections allows the same source of supply to be used either as a heating or a cooling fluid, and the presence of this jet, in connection with the arrangement of the connections, produces a thorough circulation of the temperature-varying fluids whether the same are heating or cooling fluids. By the use of two fluids of different temperatures one can be used until it has no more cooling effect, after which the other can be used. Thus an economy in the fluids is secured, especially so if the fluid which is last used is very cold, which low temperature is secured at considerable expense. Where such a low-temperature fluid is used, it can be returned to its source, so that it will not be wasted.

What I claim as my invention is—

1. The combination with a rotary casing, of plates 4, 4 secured to the ends thereof, each of the said plates having integrally formed tubular portions 6 and 9 whereof the portion 6 extends into the interior of the casing and is adapted to communicate therewith, and the portion 9 projects outwardly and is adapted to serve as a journal.

2. The combination of a rotary structure comprising inner and outer rigidly-secured rotary casings, journal members secured to the opposite ends of the outer casing, each of said members being constructed with inwardly and outwardly projecting tubular portions having a common bore whereof the outwardly-projecting portion is adapted to serve as a journal and the inwardly-projecting portion extends into the interior of the outer casing and is adapted to communicate therewith, and is also adapted to engage the inner casing, pipes extending through the bores of said journal members and into the inner casing, pipes fitted to the outer ends of the journal portions, and stuffing-boxes at the joints of the said pipes and journal portions and also at the points of entry into the interior casing of the pipes arranged in the bores of said journal members, substantially as described.

3. The combination with the inner and outer rotary casings, of a tubular structure secured to one of the ends of the outer casing and extended inwardly to the inner casing, a pipe or tube arranged within said tubular structure and extended into the inner casing, and a stuffing-box at the junction of the tubular structure and the end of the inner casing, the said stuffing-box inclosing the tube or pipe within the tubular structure.

4. The combination with a rotary casing, of tubular structures providing passage-ways to the opposite ends of the casing, a circulation-pipe disposed below the casing, connecting-pipes connecting the said circulation-pipe with the tubular structures which communicate with the interior of the casing, a steam-jet at the junction of the circulating-pipe and one of said connecting-pipes, and a check-valve in said connecting-pipe above the steam-jet, the said check-valve being adapted to permit the flow of fluid in an upwardly direction but to prevent its flow in a downwardly direction, substantially as set forth.

5. The combination with the inner and outer rotary casings, of a tubular structure providing an opening through the outer casing and adapted to afford means of communication with the interior of said casing, an inlet-pipe connected with said tubular structure for supplying the same with fluid for the interior of the outer casing, a small pipe or tube arranged within said inlet-pipe and said tubular structure and extended through the end of the inner casing so as to communicate with the interior of said casing, the said small pipe or tube being extended out of the inlet or supply pipe and the pipe connected with said small pipe or tube, whereby the latter can be supplied with liquid for the interior casing, substantially as set forth.

6. The combination with the casing providing a chamber for the temperature-varying fluids, of a supply-pipe extending from the casing to a source for supplying a fluid under ordinary temperature, and provided with a steam-jet, whereby the contents of the receptacle can be first heated by filling the casing with such fluid, and then heating the same, and can then be cooled by shutting off the jet and admitting more of such fluid, an outlet by which the casing can be drained, and a second supply-pipe leading from a source for supplying a cooling fluid at a relatively cooler temperature, whereby the contents of the receptacle can be further cooled by admitting such relatively cooler fluid to the casing after the casing has been emptied.

7. The combination with a casing providing a fluid-chamber, of means for supplying said chamber with a heating fluid, a plurality of sources for supplying a plurality of cooling fluids of different temperatures and means for conveying each of said fluids to the casing.

8. The combination with the casing providing a chamber for the temperature-varying fluids, of sources for supplying a plurality of cooling fluids, each at different temperature, pipes connecting both of said sources with the casing, and a steam-jet for heating the fluid in the casing.

9. The combination of the casing providing a chamber for the temperature-varying fluids, a source for supplying water at ordinary temperature, and another source for supplying brine at a lower temperature, pipes connecting both of said sources of supply with the casing, and a steam-jet or like device for heating the water supplied under ordinary temperature.

10. The combination with the casing providing a chamber for the temperature-varying fluids, of a source for supplying water under ordinary temperature, and another source for supplying brine at a lower temperature, pipes connecting both of said sources with the casing, a steam-jet for heating the water supplied to such casing, an outlet by which the water can be drained from the casing, and a return-pipe connecting the casing with the source for supplying brine, whereby the brine can be returned from the casing to its source of supply.

11. The combination with the casing providing a chamber for the temperature-varying fluids, of a plurality of sources for supplying the casing with a plurality of cooling fluids of different temperatures, and a device for heating one of such fluids when desired, whereby such fluid can be caused to serve as either a heating or a cooling fluid at will.

12. The combination with the casing providing a chamber for the temperature-varying fluids, of means for supplying fluid at ordinary temperature, means for supplying fluid at a relatively lower temperature, means for conveying each of said fluids to the casing, and a device for heating the fluid supplied at ordinary temperature when desired, whereby such fluid can be employed as either the heating or the cooling fluid at will, and also whereby its cooling action can be supplemented by the cooling action of the fluid supplied at a lower temperature.

13. The combination with the casing providing a chamber for the temperature-varying fluids, of sources of supply C and D for fluids at different temperatures, pipes 38 and 39 extending respectively from said sources C and D, a pipe 37 arranged as an inlet-pipe for the casing, a steam-pipe 40, a pipe 41 connecting the pipe 40 with the inlet-pipe 37, the said pipe 41 having a steam-jet 42, a circulation-pipe 44, a pipe 45 extending upwardly from the pipe 44 and having a connection with the other end of the casing, an overflow-pipe 47 connected with the pipe 45, and a return-pipe 48 connecting the pipe 45 with the source of supply D, substantially as described.

In witness whereof I hereunto subscribe my name this 22d day of December, A. D. 1900.

THEODORE L. VALERIUS.

Witnesses:
BELLE McMILLEN,
H. H. CURTIS.